United States Patent [19]
Guyot et al.

[11] Patent Number: 5,755,058
[45] Date of Patent: May 26, 1998

[54] FARMING METHOD USING WASTE MATERIAL

[75] Inventors: Jean-Noel M. Guyot, Box 179, Oak Bluff Manitoba, ROG 1N0; Rene R. Rosset, Manitoba, both of Canada

[73] Assignee: Jean-Noel M. Guyot, Manitoba, Canada

[21] Appl. No.: 247,664

[22] Filed: May 23, 1994

[51] Int. Cl.$^6$ .................................................. A01B 79/00
[52] U.S. Cl. ...................... 47/58; 71/9; 71/12; 111/200; 210/610; 239/163; 239/727
[58] Field of Search ............................. 47/58; 56/71, 500; 71/9, 11, 12, 13, 23, 6, 21; 239/159, 163, 166, 172, 727; 111/925, 200; 210/610, 602, 618, 603, 617

[56] References Cited

U.S. PATENT DOCUMENTS

| 3,522,910 | 8/1970 | Pfeiffer et al. | 239/163 |
| 4,649,113 | 3/1987 | Gould | 435/165 |
| 5,005,345 | 4/1991 | Pinckard et al. | 56/71 |

FOREIGN PATENT DOCUMENTS

| 87/13335 | of 0000 | France | |
| 7514909 | 6/1977 | Netherlands | 239/159 |
| 1358849 | 12/1987 | U.S.S.R. | 239/727 |
| 10082 | 6/1992 | WIPO | 239/727 |

OTHER PUBLICATIONS

Brochure by Bauer "Boom Cart AS 45".
Article entitled Fertilisation Du lisier sur blé.

*Primary Examiner*—James R. Feyrer
*Attorney, Agent, or Firm*—Adrian D. Battison; Murray E. Thrift

[57] ABSTRACT

A method of farming comprises collecting waste material such as manure from animal farming, or effluent from food processing plants or the like in a closed container, stirring and aerating the material within the container and adding yeast and phosphoric acid to increase aerobic bacterial activity while reducing anaerobic bacteria and rendering the material into a pumpable liquid. The material is then spread across the ground by a spreading action by pumping the material through a pipe carried on the reel of a vehicle having a boom of the order of 100 feet in width so that the material is sprayed onto the ground in an even spreading action at a rate of the order of 1000 to 5000 gallons per acre. Simultaneously an oxidizing agent such as hydrogen peroxide is sprayed onto the material, preferably immediately before the material. Prior to spreading, crop residue on the ground is chopped to small length and broken so that the oxidizing agent acts on the straw and allows the high level of aerobic bacteria in the waste material to decompose the straw with the waste material in a rapid action. Subsequently the soil is incorporated with the crop residue and material to a depth of two inches.

16 Claims, 6 Drawing Sheets

FARMING METHOD USING WASTE MATERIAL

BACKGROUND OF THE INVENTION

This invention relates to a farming method using waste material containing organic matter.

Waste material or effluent which contains organic materials, such as that from intensive animal farming operations, food processing plants and city sewage, constitutes a serious problem in that in large quantities the material is toxic and in that the material can give off noxious fumes. Disposal of such materials is therefore difficult and the development of such materials from the operation can inhibit the installation of new plants to carry out such processing.

A further problem which is becoming more prevalent in current farming methods is that of disposing of crop residue after harvesting. It is often desirable to return the crop residue to the soil but this is often difficult as it takes a significant period of time to decompose and in the meantime causes problems in the seeding and cultivation processes. Burning of the crop residue or straw is often practiced but this highly undesirable in that it generates high quantities of smoke which are environmentally undesirable and also the organic matter from the crop residue is lost.

It is known in current farming practices to effect chopping of the crop residue into relatively small portions and spreading of this material onto the ground for breakdown of the crop residue into the soil.

Usually such waste material is stored in a lagoon which is simply a hollowed open area into which the material is pumped to allow settling of the solid matter to the bottom of the lagoon and dispersal of the liquid and gas content by evaporation. Periodically it is necessary to remove the settled solids and these are often simply dumped into an open field. The continuous evaporation of the liquid acts to discharge into the air noxious gases which leads to environmental pollution which is becoming politically unacceptable. The lagoon can also leak so as to cause contamination of the ground water.

It is also known to spread waste material from hog barns and the like onto ground for disposal. One machine for this purpose includes a frame with ground wheels for moving across the ground, the frame carrying a reel on which is wound a pipe for transporting the waste material from a supply. From the reel the waste material is communicated to a spray gun or spreader which discharges the material across the ground. This type of discharge of the material is unacceptable in that it generates smell, loses nitrogen which could otherwise be available for crop growth and also can release airborne bacteria which is to health.

An alternative type of machine for carrying out disposal of waste material includes a tank which transports the material to the required location and a spray boom for discharging the material onto the ground. Generally such processes are used simply for disposal of the waste material without any other advantages being considered or expected. The waste material is thus collected from a lagoon or storage container and is simply dumped into the field in a manner which is intended simply to dispose of the material. In many cases this is done in a relatively remote location with high quantities of the material being discharged into the field simply as a disposal process. The use of a tank to transport the material is basically unacceptable for larger quantities of the material in view of the very heavy weights of such a large tank which causes compaction of the ground over which the transport vehicle travels and the repeated trips which are necessary to dispose of all of the material. A machine of this type therefore is really only suitable for relatively small quantities of waste material to be discharged.

A serious problem which arises with the discharge of materials of this type is that of the noxious or bad smelling fumes that are emitted by the anaerobic bacteria acting upon the nitrogen compounds of the waste materials. Such fumes arise wide public outcry in the event that such waste materials are dumped onto the ground in locations anywhere near any housing developments.

One example of a machine for dumping manure from hog barns is shown in article entitled "Fertilisation du lisier sur ble".

A brochure by Bauer entitled "Boom Cart AS45" shows a machine for irrigation which includes a reel cart and a boom assembly separate from the reel cart. The boom assembly is moved along a strip to be irrigated away from the reel cart and pulls a pipe from the reel. The boom assembly then moves along the strip of ground to be irrigated and water is pumped through the pipe to the boom. This arrangement is however not in any way proposed for discharging manure or other waste materials.

A further arrangement is known comprising a vehicle having a reel drum which is carried on the vehicle and supplies manure through a pipe line paid out from the reel to a jet nozzle carried on the vehicle for discharging waste materials onto the ground.

A treatment process is also known as shown in French Patent 87/13335 (Guasco) in which straw or other crop residue is transported from the field in bales or stacks to a treatment process in which the straw is mixed with waste materials from a hog operation or the like within a treatment container to provide a combination of the manure and crop residue which forms a fertilizer mix which can be returned to the ground. This process is however uneconomical in that it requires transportation of the crop residue from the ground to the treatment container and the finished mixed fertilizer from the container to the ground. It has therefore been effectively discarded.

It is also known to use an oxidizing agent, such as hydrogen peroxide, on liquid manure to destroy the anaerobic bacteria to reduce release of noxious gases.

SUMMARY OF THE INVENTION

It is one object of the present invention, therefore, to provide an improved farming system which allows the disposal of waste materials containing organic matter and which also minimizes odors, produces an organic fertilizer and accelerates crop residue decomposition.

According to one aspect of the invention there is provided a method of farming comprising collecting in a closed container waste material containing organic matter and having sufficient liquid content to allow pumping of the material through a pipe, causing growth of aerobic bacteria in the material to effect breakdown of the organic matter therein, preparing the ground in a field with crop residue thereon so that the crop residue is chopped and evenly spread over the ground, transporting the waste material to the field and evenly spreading the waste material over the ground so as to engage the crop residue such that the aerobic bacteria from the waste material causes rapid breakdown of the crop residue.

Preferably the waste material is spread over the ground by providing a machine having a central vehicle portion and a pair of boom elements each extending out to a respective side of the vehicle portion, pumping the waste material through pipe means extending longitudinally of the boom elements and discharging the waste material at spaced positions along the length of the boom elements through discharge openings, which are preferably spray nozzles to effect an even spread of the material over the ground.

Preferably the vehicle portion carries a reel having a hose wrapped thereon, the reel being rotatable to reel in and pay out the hose for communication of the waste material from a supply location through the hose to the vehicle portion, the boom has a width greater than 100 feet and the hose has a length greater than 1320 feet and the waste material is spread at a rate in the range 1000 to 5000 gallons per acre.

Preferably, after spreading the ground surface is acted upon to effect incorporation of the waste material and the crop residue into an upper layer of the soil at the ground surface to a maximum depth of two inches substantially immediately following the spreading of the waste material.

Preferably the crop residue is chopped to a length less than two inches and so as to break open an outer surface of the crop residue.

Preferably an oxidizing agent such as hydrogen peroxide is applied onto the waste material and the crop residue with the oxidizing agent being sprayed evenly over the ground. The oxidizing agent can be sprayed simultaneously with the spreading of the waste material or can be sprayed just before the spraying of the waste material. In the former case, a higher rate of application is required up to five liters per cubic meter of straw. In the latter case a rate of one to two liters can be sufficient. In both cases the oxidizing agent effects decomposition of the straw, minimizes smell and kills disease bacteria.

Preferably the waste material contained in the closed container is aerated to encourage aerobic bacterial growth and a phosphorous compound is added to the waste material in the container for containing the nitrogen compounds to inhibit release of ammonia. Yeast such as recycled brewers yeast can also be added to the waste material in the container to assist in breakdown of the organic materials.

One embodiment of the invention will now be described in conjunction with the accompanying drawings in which.

BRIEF DESCRIPTION OF THE DRAWINGS

In the drawings like characters of reference indicate corresponding parts in the different figures.

DETAILED DESCRIPTION

Figure 1:
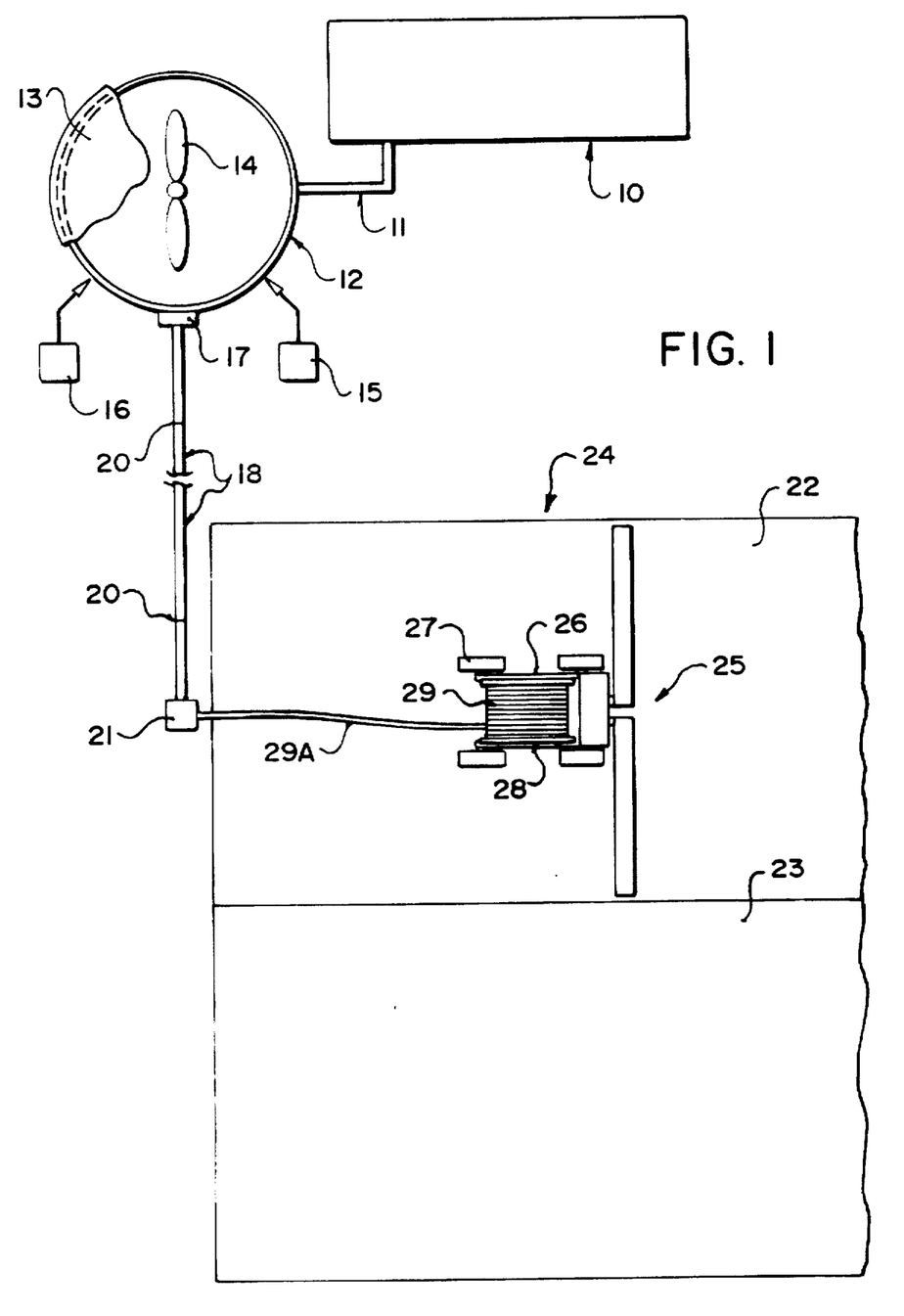
FIG. 1 is a schematic plan view of the farming system according to the present invention.

In FIG. 1 is shown an overview of the farming method according to the present invention which comprises an intensive farming system or processing system generally indicated at 10 which produces effluent or waste material on a discharge duct 11 for supplying to a storage container 12. In one example intensive farming process comprises a hog barn in which mostly liquid manure is released from a flooring collection system for discharge through the duct 11 to a liquid storage container or slurry tank 12. The storage container can be of any suitable type including a metal container of the type formed from corrugated metal panels similar to a grain bin, a concrete pit or the like which is preferably covered by a closed roof 13 which contains the liquid and any gases escaping from the liquid surface. Within the container is provided a stirring system schematically indicated at 14 which maintains the waste material mixed to ensure that solids remain in suspension. An aerator is schematically indicated at 15 for injecting air into the stored liquid waste material for purposes of aeration. The details of the air injection system are not shown as these will be well known to one skilled in the art. In addition a solids injection system is indicated at 16 for injecting various solids including yeast, additive compound such as micro nutrients and phosphoric acid as discussed hereinafter.

Figure 6:
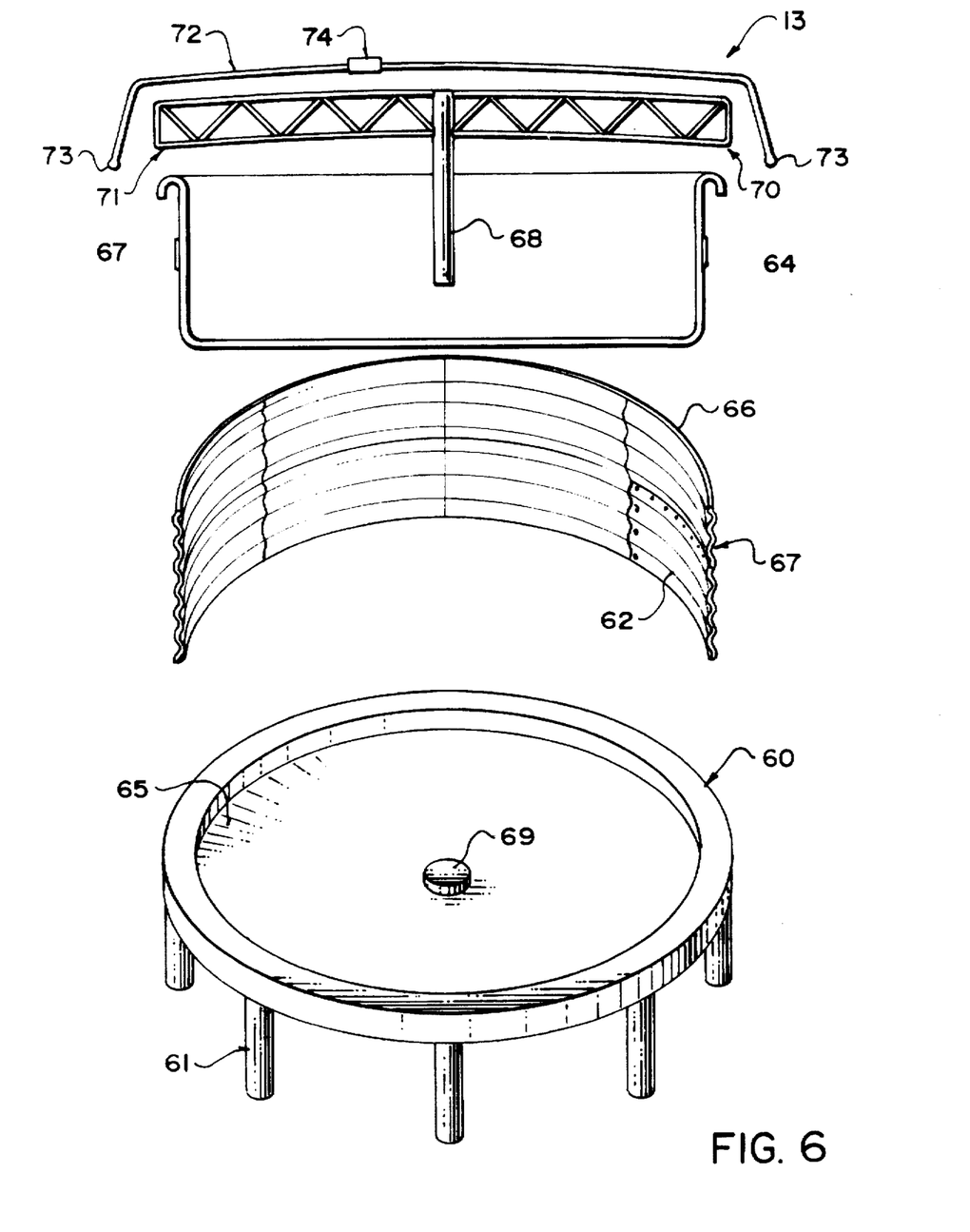
FIG. 6 is an exploded schematic isometric view of the closed container for receiving the waste material.

The construction of the container is shown schematically in FIG. 6. This comprises an annular footing 60 which can be floating or (as shown) mounted on piles 61. On top of the footing is mounted a container wall 62 formed of corrugated panels 63 which are bolted together to form a cylindrical wall standing on the footing. The wall is of the type conventionally used for a grain bin and is manufactured of structural members and the corrugated panels with sufficient structural strength to accommodate the weight and forces from the liquid waste to be contained therein.

Within the wall 62 is provided a liner 64 of a suitable plastics material. This can be spray coated onto the interior of the wall or more preferably is formed as a skin which is laid across the open ground 65 inside the annular footing 60 and extends up the wall 62 to a top edge 66. The liner is attached to the wall either mechanically or using an adhesive layer 67 which is applied onto the liner 64 on the outside surface thereof at the areas thereof engaging the wall 62 so as to affect a bonding between the liner and the wall. A roof structure comprises a central tubular post 68 sitting on a pad 69 mounted on the ground 65 centrally of the angular footing. The post carries an inner end of a plurality of radially extending trusses 70, 71 which extend outwardly into engagement with a structural member at a top edge of the wall 62. Over the trusses is stretched a circular fabric cover 72 with a lower edge bead 73 which engages around the upper edge of the wall in a sealing action. Thus the container is effectively fully sealed by the liner 64 and the fabric cover 72 to prevent any escape of gases from the container. A vent opening 74 is provided to release some gases in the event of significant over pressure to prevent damage to the structure. A structure without the post can also be used using trusses extending across the container from the side wall taking the full load of the fabric cover.

A discharge pump is schematically indicated at 17 for discharging the liquid material from the container 12 along a temporary pipe line 18 which can be formed of a number of segments connected at junctions 20 or can be a continuous irrigation hose wound on a reel. Temporary piping of this nature can be installed relatively quickly over an extensive length to an outlet location 21 which constitutes a central supply point for discharging the material from the container 12 over a number of strips 22, 23 of a field 24 on which the material is to be sprayed.

Figure 3:
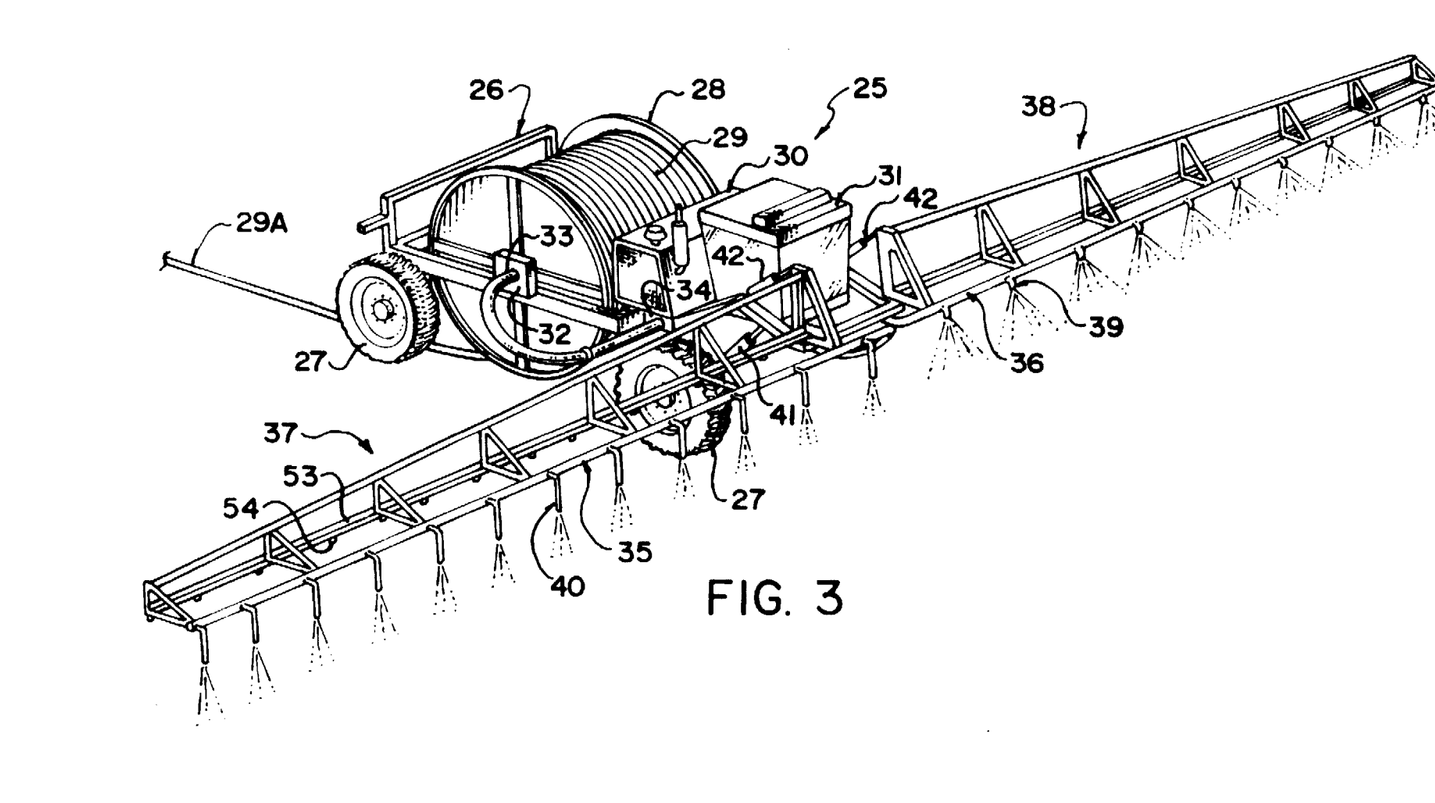
FIG. 3 is an isometric view of a machine for spreading the waste materials.
Figure 4:
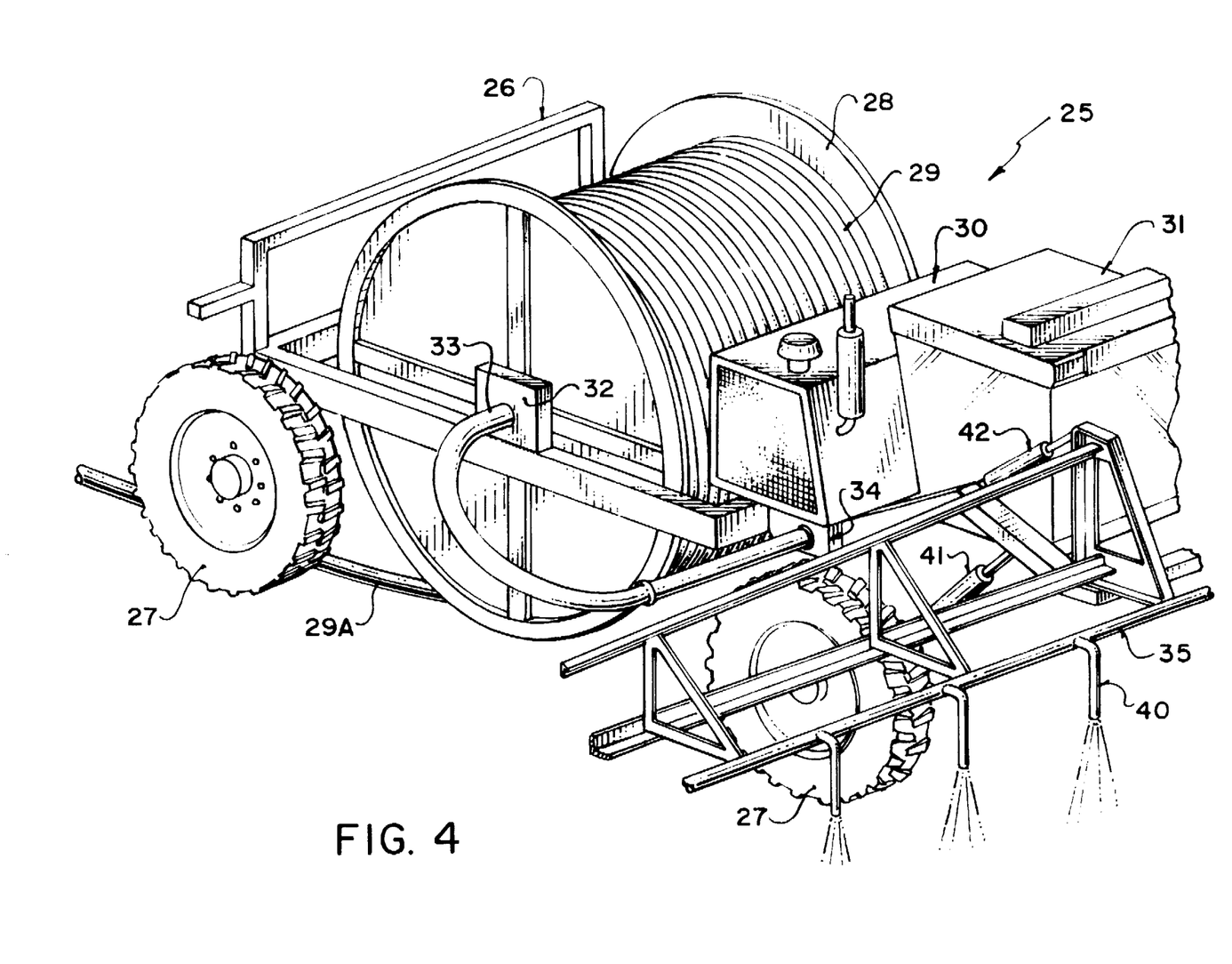
FIG. 4 is an enlarged view of the central vehicle portion of the machine of FIG. 3.
Figure 5:
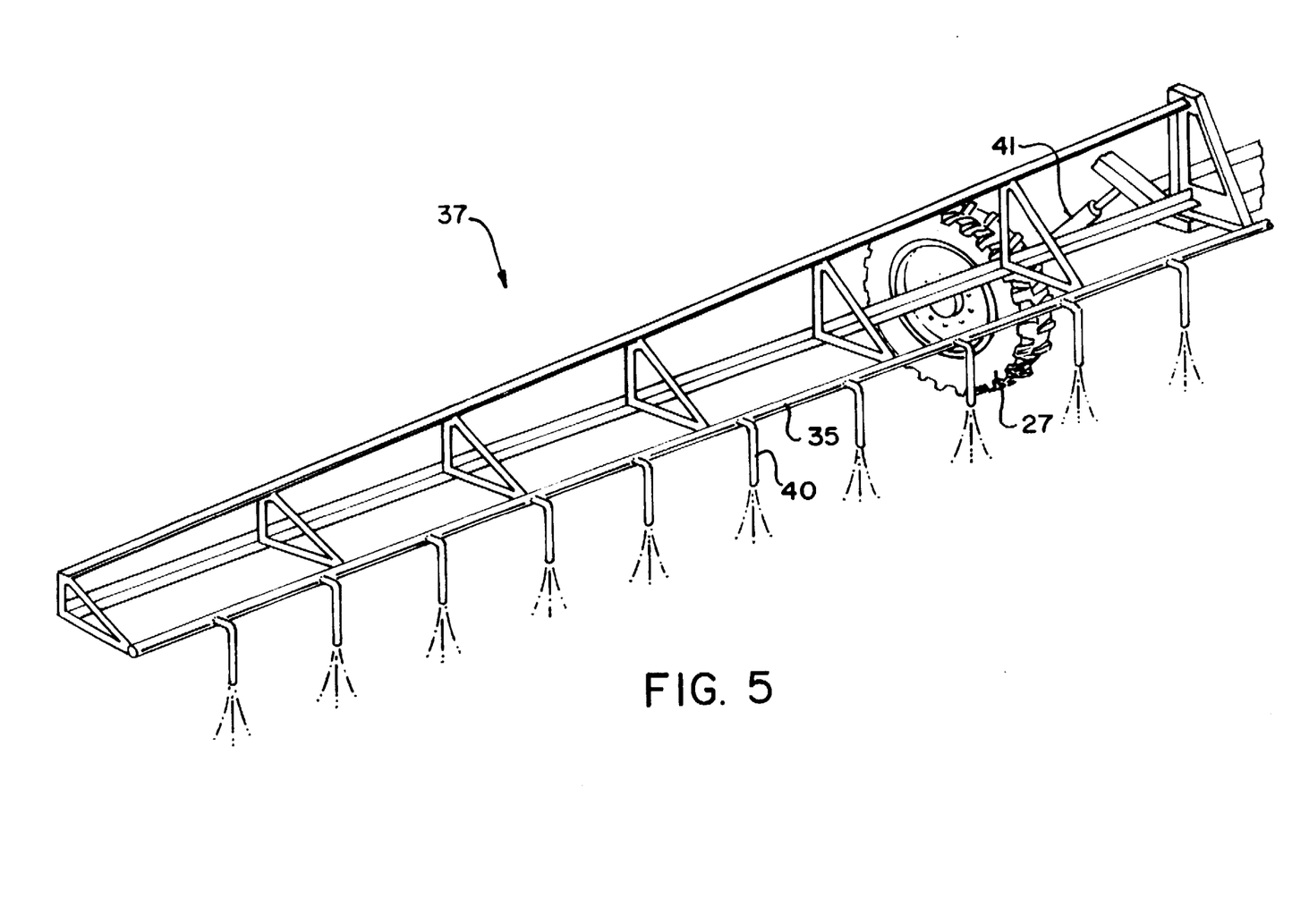
FIG. 5 is an enlarged view of one boom of the vehicle of FIG. 3.

The material is sprayed onto the strips of the field 22, 23 etc. by a spray vehicle shown schematically in FIG. 1 at 25 and shown in more detail in FIG. 3, 4 and 5. The spray vehicle comprises a vehicle frame 26 mounted on ground wheels 27 for movement across the ground. The vehicle is relatively large having a width of the central vehicle portion of the order of 10 feet and a length of the order of 25 feet. The vehicle portion carries a large reel 28 on which is wound a pipe 29, a trailing portion 29A which extends from the reel across the field to the discharge location 21. In one example the diameter of the reel is of the order of 13 feet and the length of the pipe is of the order of 1320 feet (500 meters) of a diameter of 3–4 inches (12 cms). Also on the vehicle frame is mounted an engine 30 for generating hydraulic power for communication to the four independent drive wheels 27. The details of the drive communication system are not shown as these are well known to one skilled in the art. A cab 31 is mounted at the front of the frame for receiving the driver for controlling the direction and operation of the waste material discharge machine 25. An inner end of the pipe 29 is connected to a swivel coupling 32 at which is attached a pipe 33 for communication to a supplementary drive pump 34 driven by the engine 30. The pump 34 drives the material along supply lines 35 and 36 of two boom elements 37 and 38 respectively.

The pipes 35 and 36 each carry a plurality of discharge nozzles 39, 40. The discharge nozzle 39 of the boom 38 are shown as spray nozzles and this is preferred for evenly spraying the liquid across the ground. The discharge openings 40 of the boom 37 are shown as simple vertical discharge pipes and these can be used for row crops in a situation where the machine is used after planting for discharge of the liquid onto the ground between the rows of the planted crop.

The boom elements are mounted on the frame for lifting and twisting movements by hydraulic cylinders 41, 42 which allow the boom elements to be folded along side the sides of the vehicle during transportation and to effect raising and lowering of the boom elements as required to accommodate changes in ground level.

Preferably the boom elements have a combined width of 100 to 150 feet. Discharge of the liquid material onto the ground at a rate in the range 1000 to 5000 gallons per acre can thus be effected at a rate of 3 to 7 acres per hour. Such a discharge rate enables the discharge of a typical container having 300,000 gallons within a period of 10 to 20 hours.

The construction of the boom is shown only schematically as this can vary in accordance with design requirements.

Figure 2:
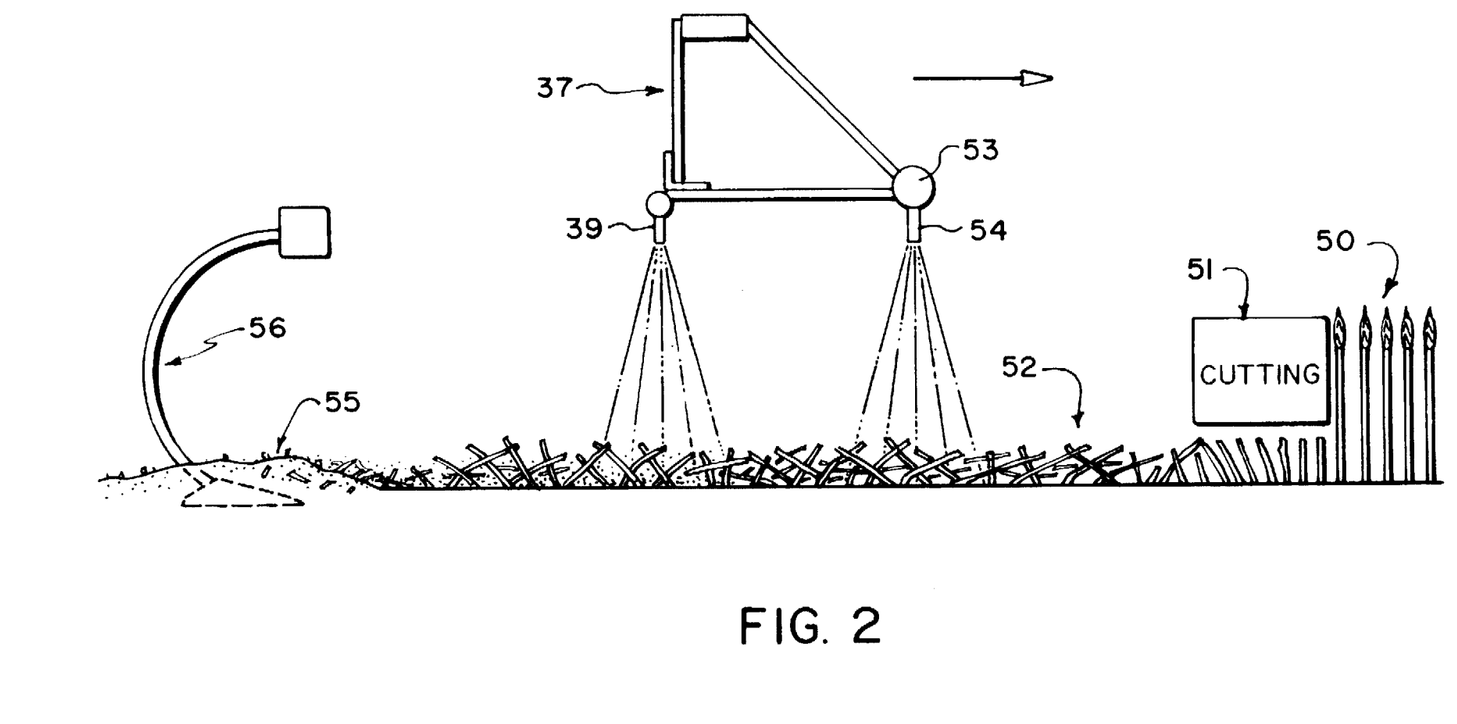
FIG. 2 is a schematic illustration of the operation of the farming system on the ground and the crop residue thereon.

Turning now to FIG. 2, the process in its operation in relation to the material on the ground is shown schematically.

In the process, the waste material to be discharged can comprise manure from a hog plant, manure or effluent from a sewage plant or other mainly liquid material containing organic materials such as effluent from a vegetable or meat processing plant. The material is arranged by addition of liquid to be mostly liquid and of sufficiently liquid nature to be pumpable through the pipeline and through the pipe 29A to the boom and the spray nozzles. For this purpose a solids content less than 8% is generally required.

The treatment of the liquid material in the container includes the following:

1) aeration by injection of aeration air from the injector 15 to promote aerobic bacterial action and to reduce anaerobic bacterial action. It is known that the anaerobic bacterial action generates production of noxious fumes which become unacceptable to surrounding persons not connected with the production site.

2) Addition of phosphorous compound or phosphoric acid. This addition acts to stabilize the nitrogen content within the liquid by locking in the ammonia. In particular, the addition of phosphoric acid to ammonia generates ammonium phosphate which is a stable compound widely used as a fertilizer.

3) The addition of a yeast which can preferably be a recycled beer yeast and this acts to break down the solids from the manure to increase the liquid content and render the liquid pumpable.

4) The stirring action by the stirrer 14 which maintains the materials mixed to effect the above action on the materials.

5) The addition of water if required to reduce the solids content to a level in the range 5 to 8% which provides the pumpable mixture. Generally the addition of yeast to break down the solids is preferred to avoid the addition of further water which may not be readily available.

6) The addition by the injector 16 of micro nutrients or other additives which are selected in accordance with requirements for the particular field 24 to be covered with the materials. Thus, as the present method is intended as a fertilization system, the required content of the fertilizer can be manipulated to match the requirements of the field as assessed by analysis of the soil in well known manner.

As shown in FIG. 2, a standing crop is indicated at 40 and this is cut by a conventional cutting action indicated schematically at 41. The cutting action schematically indicated at 41 may comprise any suitable technique for chopping the crop residue into short lengths of preferably two inches maximum length and at the same time breaking the stems of the crop residue to expose the inner material. Such an action can be effected by a separate mowing process carried out after harvesting or can be effected by use of an effective chopper and spreading action on the combine harvester. It is necessary in addition that the crop residue or trash be spread evenly across the ground.

The crop residue in evenly spread chopped condition is therefore indicated at 42. The boom element 37 is shown in FIG. 2 passing over the ground on which the evenly spread crop residue is shown. The waste material is discharged in a spray pattern from the nozzles 39 onto the crop residue in even manner determined by the spray pattern of the nozzles and the spacing of the nozzles. The liquid manure is thus accurately broadcast onto the fields at a regulated flow rate in the range 1000 gallons per acre to 5000 gallons per acre. Simultaneously with the spraying of the manure is provided a second spray line 53 with spray nozzles 54 arranged for spraying a liquid oxidizing agent such as hydrogen peroxide onto the trash and the manure. The hydrogen peroxide or oxidizing agent is preferably sprayed at a rate in the range two liters to five liters per cubic meter of straw or crop residue. The Hydrogen peroxide rate identified above relates to 130 volume concentration and the man skilled in the art will of course be able to calculate modified rates for different concentrations of the oxidizing agent. The oxidizing agent acts to further decompose the outer protective shell of the crop residue and acts to accelerate aerobic bacterial and fungal attack on the crop residue. Furthermore the oxidizing agent effectively eradicates any anaerobic bacteria remaining in the manure so as to inhibit or prevent the generation of noxious gases, such as methane and hydrogen sulfide, which are a resultant of the anaerobic bacterial activity. Thus the previous treatment as explained above of the manure in conjunction with the addition of the oxidizing agent at the point of application of manure to the ground cooperate in preventing the generation of the free ammonia which constitutes the objectionable smell associated with the manure. In addition the simultaneous spraying of the oxidizing agent and the manure significantly increases the rate of bacterial and fungal attack on the crop residue since the manure brings high levels of aerobic bacteria and fungus to the mixture to assist in breaking down the crop residue.

The rapid action of the decomposition is important as this fertilizer, that is the combination of the manure and the crop residue, is applied onto the fields prior to seeding or after seeding and constitutes a replacement for the commercial fertilizer otherwise used. In cases where the manure is applied after seeding, the oxidizing agent is omitted to avoid damaging the crops and since in most cases it is not required to effect break down of the straw. Application after seeding is therefore likely to be limited to areas where the release of some smells does not constitute an environmentally unacceptable situation.

To achieve the rapid decomposition, the crop residue and stubble must be in contact with the liquid manure and accordingly the even spread of the crop residue across the ground is highly important and in addition it is necessary to apply equally an even spread of the manure.

As shown in FIG. 2, the oxidizing agent is preferably sprayed from the same boom as the waste material but is sprayed onto the ground in advance of the waste material. This allows the agent to engage the straw in advance of the waste material and thus minimizes the required rate to 1–2 liters per cubic meter of straw. In the alternative, the oxidizing agent can be sprayed from a separate nozzle at the same location as the nozzle 39 to reach the straw simultaneously with the waste material, but in this case the rate must be increased to the order of 5 liters.

Subsequent to the application of the manure and the oxidizing agent, the trash and manure is then incorporated into the soil to a maximum depth of two inches. This is illustrated schematically at 55. The incorporation can be effected by any conventional cultivation equipment such as a harrow, a cultivator sweep as illustrated at 56 or a hoe. The incorporation is effected as soon as possible after completion of the spraying of the material and generally within 24 hours. Incorporation to a depth greater than two inches will significantly inhibit or delay the decomposition due to the absence or the exclusion of oxygen which is necessary for the aerobic bacterial activity.

The method according to the present invention, therefore, has a number of major advantages.

1) It disposes of the liquid manure or other liquid effluent which is otherwise problematic.

2) It disposes of the crop residue which also can in some cases be problematic.

3) The disposal of both of the above materials is effected in a manner which generates an improved organic fertilization system. Thus reducing the necessity for other types of fertilizer.

4) The process is effected using equipment specifically designed for the task which enables the application of the manure to be effected rapidly and economically.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. In a farming operation, a method of disposing of waste manure in liquid solution in a manner which allows for the more rapid decomposition of decay resistant crop residues, the improvement which includes the steps of:

collecting in a static, liquid impervious container said waste manure containing organic matter and having sufficient liquid content to allow pumping of the manure through a pipe;

mixing oxygen into said waste manure to cause the growth of aerobic bacteria to effect breakdown of the organic matter therein and to reduce the growth of anaerobic bacteria;

preparing the ground in a field with crop residue thereon so that the crop residue is chopped and evenly spread over the ground;

fluidly communicating said waste manure container containing said aerobic bacteria in liquid solution with a field dispenser by means of a pipe;

and evenly spreading the waste manure over the ground at a rate in the range 1000 to 5000 gallons per acre so as to engage the crop residue such that the aerobic bacteria carried by the waste manure causes rapid bacterial breakdown of the crop residues;

whereby, the breakdown of the crop residue is accelerated, the fertility of the soil is enhanced and waste manure is disposed of with a reduction in the odors of anaerobic decomposition.

2. The method according to claim 1 wherein the waste manure is spread over the ground by providing a machine having a central vehicle portion and a pair of boom elements each extending out to a respective side of the vehicle portion, pumping the waste manure through pipe means extending longitudinally of the boom elements and discharging the waste manure at spaced positions along the length of the boom elements through discharge openings.

3. The method according to claim 2 wherein the waste manure is discharged through spray nozzles.

4. The method according to claim 2 wherein the vehicle portion carries a reel having a hose wrapped thereon, the reel being rotatable to reel in and pay out the hose for communication of the waste manure from a supply location through the hose to the vehicle portion.

5. The method according to claim 2 wherein the waste manure is transported by a pump from the container through a temporarily installed piping to the supply location.

6. The method according to claim 2 wherein the vehicle portion includes a supplementary pump thereon for the waste manure.

7. The method according to claim 1 wherein the waste manure contained in the container is aerated to encourage aerobic bacterial growth.

8. The method according to claim 1 including adding to the waste manure in the container a phosphorous compound.

9. The method according to claim 1 including adding yeast to the waste manure in the container.

10. In a farming operation, a method of disposing of waste manure in liquid solution in a manner which allows for the more rapid decomposition of decay resistant crop residues, the improvement which includes the steps of:

collecting in a static, liquid impervious container said waste manure containing organic mater and having sufficient liquid content to allow pumping of the manure through a pipe;

mixing oxygen into said waste manure to cause the growth of aerobic bacteria to effect breakdown of the organic matter therein and to reduce the growth of anaerobic bacteria;

preparing the ground in a field with crop residue thereon so that the crop residue is chopped and evenly spread over the ground;

fluidly communicating said waste manure container containing said aerobic bacteria in liquid solution with a field dispenser by means of a pipe;

and evenly spreading the waste manure over the ground so as to engage the crop residue such that the aerobic bacteria carried by the manure causes rapid bacterial breakdown of the crop residue;

and, separately from and immediately prior to spreading the manure spraying onto the crop residue a liquid containing an oxidizing agent in an effective concentration greater than that of the oxygen in the air;

whereby, the breakdown of the crop residue is accelerated, the fertility of the soil is enhanced and waste manure is disposed of with a reduction in the odors of anaerobic decomposition.

11. The method according to claim 10 wherein, after spreading, the ground is acted upon by a cultivator to effect incorporation of the waste material and the crop residue into an upper layer of the soil at the ground surface.

12. The method according to claim 11 wherein the incorporation is effected to a maximum depth of two inches.

13. The method according to claim 10 wherein the waste material is spread over the ground by providing a machine having a central vehicle portion and a pair of boom elements each extending out to a respective side of the vehicle portion, pumping the waste material through pipe means extending longitudinally of the boom elements and discharging the waste material at longitudinally spaced positions along the length of the boom elements through discharge openings, and wherein the oxidizing agent is sprayed by a plurality of nozzles provided on the boom elements at positions therealong which are spaced longitudinally and are spaced forwardly relative to a direction of travel of the machine.

14. The method according to claim 10 wherein the oxidizing agent is hydrogen peroxide.

15. In a farming operation, a method of disposing of waste manure in liquid solution in a manner which allows for the more rapid decomposition of decay resistant crop residues, the improvement which includes the steps of:

collecting in a static, liquid imperious container said waste manure containing organic matter and having sufficient liquid content to allow pumping of the manure through a pipe;

mixing oxygen into said waste manure to cause the growth of aerobic bacteria to effect breakdown of the organic matter therein and to reduce the growth of anaerobic bacteria;

preparing the ground in a field with crop residue thereon so that the crop residue is chopped and evenly spread over the ground;

fluidly communicating said waste manure container containing said aerobic bacteria in liquid solution with a field dispenser by means of a pipe;

and evenly spreading the waste manure over the ground so as to engage the crop residue such that the aerobic bacteria carried by the waste manure causes rapid bacterial breakdown of the crop residue;

and, after spreading, substantially immediately acting upon the ground with a cultivator means to effect incorporation of the waste material and the crop residue into an upper layer of the soil at the ground surface;

whereby, the breakdown of the crop residue is accelerated, the fertility of the soil is enhanced and waste manure is disposed of with a reduction in the odors of anaerobic decomposition.

16. The method according to claim 15 wherein the incorporation is effected to a maximum depth of two inches.

* * * * *